(12) United States Patent
Folkman et al.

(10) Patent No.: US 12,111,850 B2
(45) Date of Patent: **\*Oct. 8, 2024**

(54) GENEALOGICAL ENTITY RESOLUTION SYSTEM AND METHOD

(71) Applicant: Ancestry.com Operations Inc., Lehi, UT (US)

(72) Inventors: Tyler Folkman, Lehi, UT (US); Rey Furner, Pleasant Grove, UT (US)

(73) Assignee: Ancestry.com Operations Inc., Lehi, UT (US)

( \* ) Notice: Subject to any disclaimer, the term of this patent is extended or adjusted under 35 U.S.C. 154(b) by 218 days.

This patent is subject to a terminal disclaimer.

(21) Appl. No.: 17/715,649

(22) Filed: Apr. 7, 2022

(65) Prior Publication Data

US 2022/0229855 A1    Jul. 21, 2022

Related U.S. Application Data

(63) Continuation of application No. 16/758,757, filed as application No. PCT/US2018/056678 on Oct. 19, 2018, now Pat. No. 11,321,361.

(Continued)

(51) Int. Cl.
*G06F 17/00* (2019.01)
*G06F 16/22* (2019.01)
(Continued)

(52) U.S. Cl.
CPC ........ *G06F 16/285* (2019.01); *G06F 16/2246* (2019.01); *G06F 16/288* (2019.01); *G06N 20/00* (2019.01); *G06F 17/11* (2013.01)

(58) Field of Classification Search
CPC .. G06F 16/285; G06F 16/2246; G06F 16/288; G06F 16/906; G06F 17/11; G06N 20/00
See application file for complete search history.

(56) References Cited

U.S. PATENT DOCUMENTS 7,657,540 B1    2/2010  Bayliss
8,798,915 B2 \*  8/2014  Dzubay ................ G06F 16/285
                                    701/410

(Continued)

OTHER PUBLICATIONS

Nam Wook Kim et al., Tracing genealogical data with TimeNets. In Proceedings of the International Conference on Advanced Visual Interfaces. Association for Computing Machinery, 241-248. <https://doi.org/10.1145/1842993.1843035>, May (Year: 2010).\*

(Continued)

*Primary Examiner* — Greta L Robinson
(74) *Attorney, Agent, or Firm* — Fenwick & West LLP

(57) ABSTRACT

Systems and methods for determining whether two tree persons in a genealogical database correspond to the same real-life individual. Embodiments include obtaining, from a tree database, a first tree person from a first genealogical tree and a second tree person from a second genealogical tree. Embodiments also include identifying a plurality of familial categories. Embodiments further include, for each familial category of the plurality of familial categories, extracting a first quantity of features for each of the tree persons in the familial category, generating a first similarity score for each possible pairing of tree persons, identifying a representative pairing based on a maximum first similarity score, and extracting a second quantity of features for each of the tree persons in the representative pairing. Embodiments may also include generating a second similarity score based on the second quantity of features.

20 Claims, 14 Drawing Sheets

Related U.S. Application Data

(60) Provisional application No. 62/576,462, filed on Oct. 24, 2017.

(51) Int. Cl.
  *G06F 16/28* (2019.01)
  *G06N 20/00* (2019.01)
  *G06F 17/11* (2006.01)

(56) References Cited

U.S. PATENT DOCUMENTS

| | | |
|---|---|---|
| 9,390,225 B2 | 7/2016 | Barber et al. |
| 11,321,361 B2 * | 5/2022 | Folkman ............... G06F 16/288 |
| 2005/0267903 A1 * | 12/2005 | Golze .................... G06Q 10/10 |
| 2011/0099193 A1 | 4/2011 | Jensen |
| 2014/0108527 A1 | 4/2014 | Aravanis et al. |
| 2014/0222792 A1 | 8/2014 | Groeneveld et al. |
| 2015/0039636 A1 * | 2/2015 | Sederberg ............... G06F 40/14 |
| | | 707/755 |
| 2016/0103950 A1 | 4/2016 | Myres et al. |
| 2017/0091692 A1 | 3/2017 | Guo et al. |
| 2017/0293861 A1 | 10/2017 | Roy et al. |

OTHER PUBLICATIONS

PCT International Search Report and Written Opinion, PCT Application No. PCT/US2018/056678, Jan. 4, 2019, 12 pages.

* cited by examiner

GENEALOGICAL ENTITY RESOLUTION SYSTEM AND METHOD

CROSS-REFERENCE TO RELATED APPLICATIONS

The present application is a continuation of U.S. patent application Ser. No. 16/758,757, filed on Oct. 19, 2018, which is a national stage entry of International Application No.: PCT/US2018/056678, filed on Oct. 19, 2018, which claims the benefit of U.S. Provisional Patent Application 62/576,462 filed on Oct. 24, 2017. All of the foregoing are hereby incorporated by reference in their entirety for all purposes.

BACKGROUND OF THE INVENTION

In certain genealogical or family history databases, ancestor data is stored in trees which contain one or more persons or individuals. Trees may also include intra-tree relationships which indicate the relationships between the various individuals within a certain tree. In many cases, persons in one tree may correspond to persons in other trees, as users have common ancestors with other users. One challenge in maintaining genealogical databases has been entity resolution, which refers to the problem of identifying and linking different manifestations of the same real world object. For example, many manifestations of the same person may appear across multiple trees. This problem arises due to discrepancies between different historical records, discrepancies between historical records and human accounts, and discrepancies between different human accounts. For example, different users having a common ancestor may have different opinions as to the name, date of birth, and place of birth of that ancestor. The problem becomes particularly prevalent when large amounts of historical documents are difficult to read, causing a wide range of possible ancestor data. Accordingly, there is a need for improved techniques in the area.

BRIEF SUMMARY OF THE INVENTION

Embodiments of the present invention include a method for determining whether two tree persons in a genealogical database correspond to the same real-life individual. In one aspect of the present disclosure, a method is provided. The method may include obtaining, from a tree database, a first tree person from a first genealogical tree and a second tree person from a second genealogical tree. In some embodiments, each of the first genealogical tree and the second genealogical tree comprise a plurality of interconnected tree persons corresponding to individuals that are related to each other. The method may also include identifying a plurality of familial categories, each of the familial categories including at least one tree person from each of the first genealogical tree and the second genealogical tree. The method may further include, for each familial category of the plurality of familial categories, extracting a first quantity of features for each of the tree persons in the familial category, generating a first similarity score for each possible pairing of tree persons from different genealogical trees based on the first quantity of features, identifying a representative pairing based on a maximum first similarity score, and extracting a second quantity of features for each of the tree persons in the representative pairing. The method may include generating a second similarity score based on the second quantity of features for each of the tree persons in the representative pairing for each of the familial categories. The method may also include determining that the first tree person and the second tree person correspond to a same individual based on the second similarity score.

In some embodiments, the plurality of familial categories includes one or more of ego, mother, father, spouse, and child. In some embodiments, the first quantity of features is less numerous than the second quantity of features. In some embodiments, the second quantity of features includes one or more of a first name, a first name similarity, a first name uniqueness, a last name, a last name similarity, a last name uniqueness, a birth month, a birth day, a birth year, a death month, a death day, a death year, a marriage month, a marriage day, and a marriage year, a birth city, a birth county, a birth state, a birth country, a death city, a death county, a death state, a death country, a marriage city, a marriage county, a marriage state, a marriage country, a gender, a residence city, a residence county, a residence state, a residence country, a residence month, a residence day, a residence year. In some embodiments, the method may include obtaining, from a cluster database, information corresponding to additional tree persons for at least one of the familial categories. The method may also include obtaining, from the tree database, the additional tree persons. The method may further include causing the additional tree persons to be included in the at least one of the familial categories. In some embodiments, the method may include modifying the cluster database to reflect that the first tree person and the second tree person correspond to a same individual. In some embodiments, modifying the cluster database to reflect that the first tree person and the second tree person correspond to a same individual includes modifying one or more node connections within the cluster database such that a first node corresponding to the first tree person connects directly with a second node corresponding to the second tree person.

In another aspect of the present disclosure, a non-transitory computer-readable storage medium is provided. In some embodiments, the non-transitory computer-readable storage medium may include instructions that, when executed by a processor, cause the processor to perform operations including the method as described above. In yet another aspect of the present disclosure, a system is provided. The system may include one or more processors. The system may also include one or more computer readable storage media including instructions that, when executed by the one or more processors, cause the one or more processors to perform operations including the method as described above.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
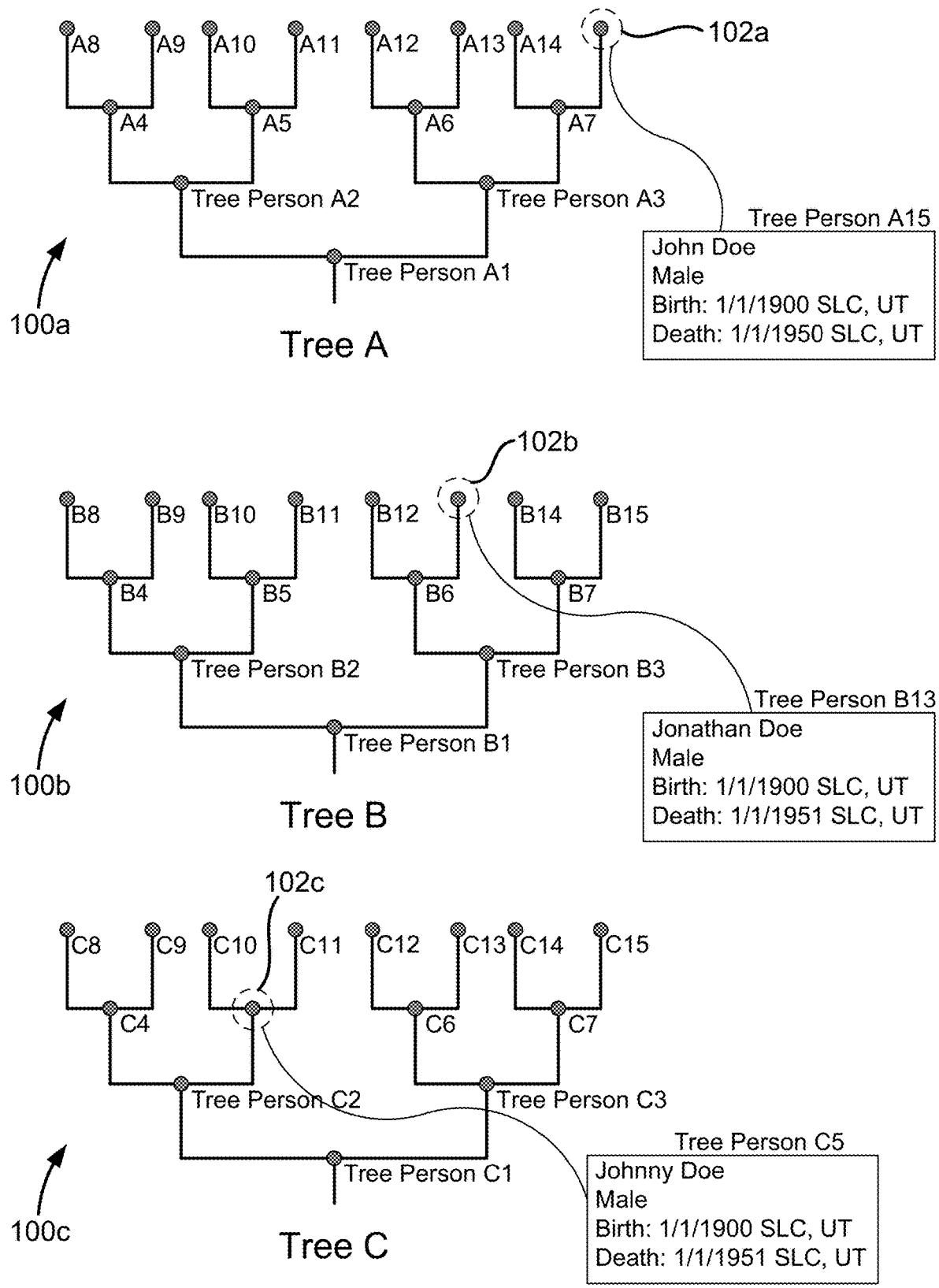
FIG. 1 illustrates various trees having similar individuals, according to an embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Entity resolution is a long studied problem that still poses some interesting challenges. The problem is defined as identifying and linking different manifestations of the same real world object. Many organizations collect data on entities with potential duplicate data. For certain genealogical databases, each user may have a personal genealogical tree. These trees often have overlap with other users' trees which creates duplicate entities in a genealogical database. One way to track known duplicates is to resolve multiple entities into one cluster. This provides immense value to users by allowing them to receive more targeted hints, understand how they are related to people outside their tree, and have a more precise searching capabilities.

Embodiments of the present disclosure relate to modifying a cluster database when it is determined that two persons in different trees correspond to the same individual. In some instances, a node connection made be generated between two nodes corresponding to the two persons in different trees. This technique may be used incrementally during the generation of the cluster database. Thus, as a user creates a new node or edits an existing node, the disclosed technique may be used to check whether that node resolves to a current entity cluster or whether it should generate its own cluster. The process may be performed incrementally, as opposed to a single batch process, for performance reasons. This entity resolution problem is a challenging problem for many reasons including inaccurate data, misspellings, and difficult compares such as siblings with the same name.

Another advantage of identifying these duplicate persons is that one user may have information for their ancestor that another user does not. As more duplicate persons are identified, rather than list every duplicate person for the user to browse, it may be more helpful to show a user an aggregation of all the duplicates merged together in a single, concise view of the cluster (i.e., a grouping of duplicate persons). Another advantage of identifying duplicate persons is that if users A and B have a duplicate person in their family trees, then it can be determined that users A and B are related to each other at least via the duplicate person. Furthermore, once the duplicate person is identified, user A may supplement his/her family tree with information from user B's family tree, and vice-versa.

As used herein, the terms "tree", "family tree", and "genealogical tree" may be used interchangeably and may refer to the grouping of a finite number of related persons that are interconnected according to their relationships. Two persons that are directly connected in a tree may be in a parent-child relationship, in a sibling relationship, or in some other relationship. A tree may be displayed as various points connected by lines. The base or bottom of the tree may comprise a single individual, which may or may not be a user of the tree.

As used herein, the terms "tree person", "person", "individual", and "node" may be used interchangeably and may refer to a representation in a tree of a living or deceased real-life individual.

As used herein, the term "user" may refer to an owner or creator of a tree, or may refer to any entity, human or non-human, that is using a tree or genealogical database in some manner.

As used herein, the term "cluster" may refer to a grouping of tree persons, each from different trees and each determined to correspond to the same real-life individual. Although clusters are designed to group only tree persons that correspond to the same real-life individual, this is not always possible, and often clusters are either overinclusive or underinclusive based on the similarity threshold that is employed.

FIG. 1 illustrates trees 100a-c, each having similar individuals 102a-c, according to an embodiment of the present disclosure. Trees 100a-c are also denoted as Trees A, B, and C, respectively. Trees A, B, and C may be owned by, created by, and/or used by Tree Persons A1, B1, and C1, or by some other users unrelated to persons in Trees A, B, and C. In some embodiments, it may be determined that Tree Person A15 (named "John Doe"), Tree Person B13 (named "Jonathan Doe"), and Tree Person C5 (named "Johnny Doe") correspond to the same real-life individual based on their similarity. Although a user of Tree A may understand Tree Person A15 to be John Doe, it may be beneficial to that user to become aware of the information discovered by the users of Trees B and C, who understand John Doe to have a differently spelled name and a different date of death. Similarly, users of Trees B and C may benefit to know of alternate spellings and dates of death for Tree Persons B13 and C5, whom they understand to be Jonathan Doe and Johnny Doe. Therefore, to assist users of Trees A, B, and C in their genealogical research, it is often advantageous to identify, group, and possibly merge together tree persons that are determined to correspond to the same real-life individual.

One method for determining whether Tree Persons A15, B13, and C5 correspond to the same real-life individual is a rule-based algorithm in which a human expert looks at different pairs of persons and creates rules. For example, consider that two persons are named "Jack Smith" but one is born in Mar. 1, 1981 and the other is born in Mar. 1, 1932. A rule-based algorithm may generate four separate scores, one for a comparison of the names (a high score in this example), one for a comparison of the month of birth (a high score in this example), one for a comparison of the day of birth (a high score in this example), and one for the year of birth (a low score in this example). The four separate scores are added together to generate a final similarity score. The higher the similarity score, the higher the probability that the two tree persons correspond to the same real-life individual.

There are several disadvantages to rule-based algorithms. First, they are subjective. When scores are combined into a final similarity score, they may be weighted such that the final similarity score is overly sensitive to the chosen weighting, which may be arbitrary. Second, rule-based algorithms become extremely complicated as they must account for several special cases, such as popular names. Third, rule-based algorithms are difficult to update and maintain. Over time, there may be hundreds of rules to generate a single final similarity score. If new special cases arise, a human expert has to verify whether all the previously generated rules will apply to the new case or not. If a particular rule does not apply, then a change may be needed.

Figure 2:
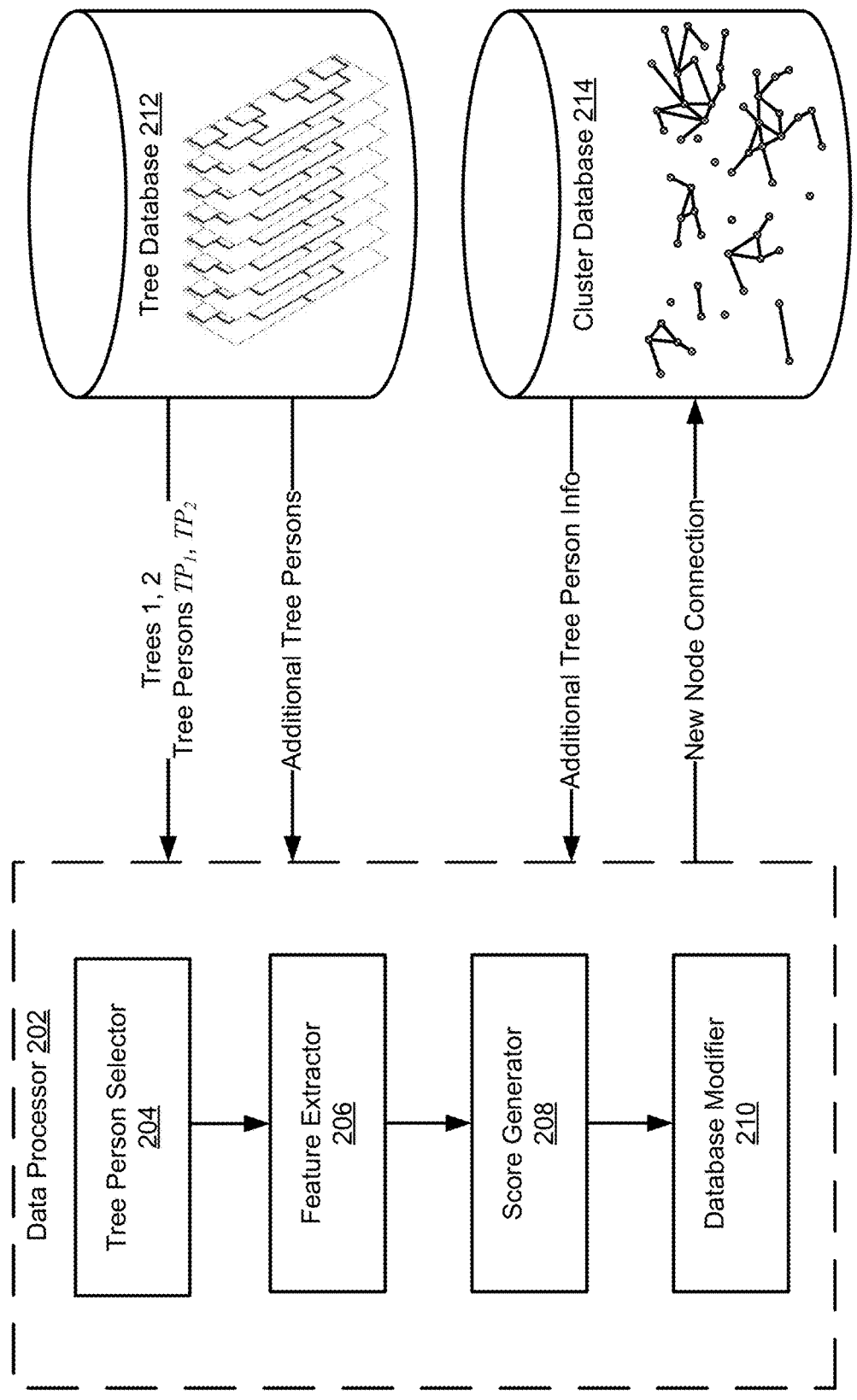
FIG. 2 illustrates a block diagram of a system for modifying a cluster database, according to an embodiment of the present disclosure.

FIG. 2 illustrates a block diagram of a system 200 for modifying a cluster database 214, according to an embodiment of the present disclosure. System 200 includes a data processor 202 and two databases, a tree database 212 and a cluster database 214. In some embodiments, tree database 212 and cluster database 214 may be maintained as a single database.

In some embodiments, data processor 202 includes a tree person selector 204 for selecting two tree persons, referred to as $TP_1$ and $TP_2$, from tree database 212. Tree persons $TP_1$ and $TP_2$ are generally selected from two different family trees, although in some embodiments they may be selected from the same family tree. In some embodiments, data processor 202 includes a feature extractor 206 for extracting features from tree persons $TP_1$ and $TP_2$, and from additional tree persons that are selected from tree database 212. Features extracted from tree person $TP_1$ may be referred to as a first feature vector $f_{1,i}$ and features extracted from tree person $TP_2$ may be referred to as a second feature vector $f_{2,i}$. Feature extractor 206 may employ machine learning techniques to extract feature vectors $f_{1,i}$ and $f_{2,i}$. In some embodiments, after tree persons $TP_1$ and $TP_2$ are obtained, data processor 202 may obtain additional tree person information from cluster database 214. The additional tree person information may identify tree persons that share a cluster with close family members of tree persons $TP_1$ and $TP_2$., as will be explained in reference to FIGS. 3A-3F. After obtaining the additional tree person information, the additional tree persons identified in the additional tree person information may be obtained by data processor 202 from tree database 212.

In some embodiments, data processor 202 includes a score generator 208 for generating a score based features extracted by feature extractor 206. In some instances, the first feature vector $f_{1,i}$ and the second feature vector $f_{2,i}$ are used to generate a metric function $s(f_i)$, where $f_i$ is a combined feature vector. If the number of features is equal to n, then score generator 208 may calculate n different metrics between the first feature vector $f_{1,i}$ and the second feature vector $f_{2,i}$. For example, if n=2 and $f_{1,i}$=("John", 1956) and $f_{2,i}$=("John", 1958), then a first metric may be calculated based on the difference between the two strings ("John" and "John") to be equal to 1, and a second metric may be calculated based on the difference between the two integers (1956 and 1958) to be equal to 0.83. The resulting metric function $s(f_i)$ in this example would be equal to (1, 0.83). Metrics may yield values between 0 and 1, where 0 indicates low similarity and 1 indicates high similarity. In some embodiments, metrics are not restricted to yield values between 0 and 1. A specific example of how the metric function s(f) is generated is described in reference to FIG. 5.

In some embodiments, the Jaro-Winkler distance is used as the metric between two strings and cosine-similarity is used as the metric between any two non-strings, such as integers and vectors. Other possible metrics that may be employed within the metric calculator 208 include but are not limited to: edit distance, affine gap distance, Smith-Waterman distance, and Q-gram distance. In some embodiments, score generator 208 may employ machine learning techniques to generate a similarity score based on extracted features of two tree persons.

In some embodiments, score generator 208 may generate a similarity score between tree persons (e.g., $TP_1$ and $TP_2$) using the following equation:

$$t = \sum_{i=1}^{n} w_i * s(f_i)$$

where n is the number of features $f_i$ and $w_i$ is the feature weight for the i-th feature $f_i$. The similarity score t is generated based on a weighted sum of metric function $s(f_i)$ being weighted by feature weights $w_i$. In some embodiments, feature weights may be calculated using machine learning techniques in which various training data prepared by genealogists are used to train score generator 208.

In some embodiments, data processor 202 includes a database modifier for modifying cluster database 214 based on whether it is determined that tree persons $TP_1$ and $TP_2$ correspond to the same individual. In some instances, when it is determined that tree persons $TP_1$ and $TP_2$ correspond to the same individual, a new node connection is generated in cluster database 214 between a first node corresponding tree person $TP_1$ and a second node corresponding to tree person $TP_2$. In contrast, when it is determined that tree persons $TP_1$ and $TP_2$ do not correspond to the same individual, a node connection may be removed in cluster database 214 between a first node corresponding tree person $TP_1$ and a second node corresponding to tree person $TP_2$. In some embodiments, generating a new node connection or removing a previous node connection may include closing or opening an electrical switch in an electrical circuit within cluster database 214.

FIGS. 3A-3F illustrate various steps for determining whether two tree persons, tree person D8 and tree person E5, correspond to the same individual, according to an embodiment of the present disclosure. In the example shown, tree person D8 may be from the same family tree as tree persons D1 (mother), D3 (father), D6 (spouse), and D9-D12 (children), and tree person E5 may be from the same family tree as tree persons E1 (father), E2 (mother), E7 (spouse), and E9-E10 (children). The remaining tree persons may be from different family trees but may belong to the same cluster as the tree persons shown in familial categories 302.

Figure 3A:
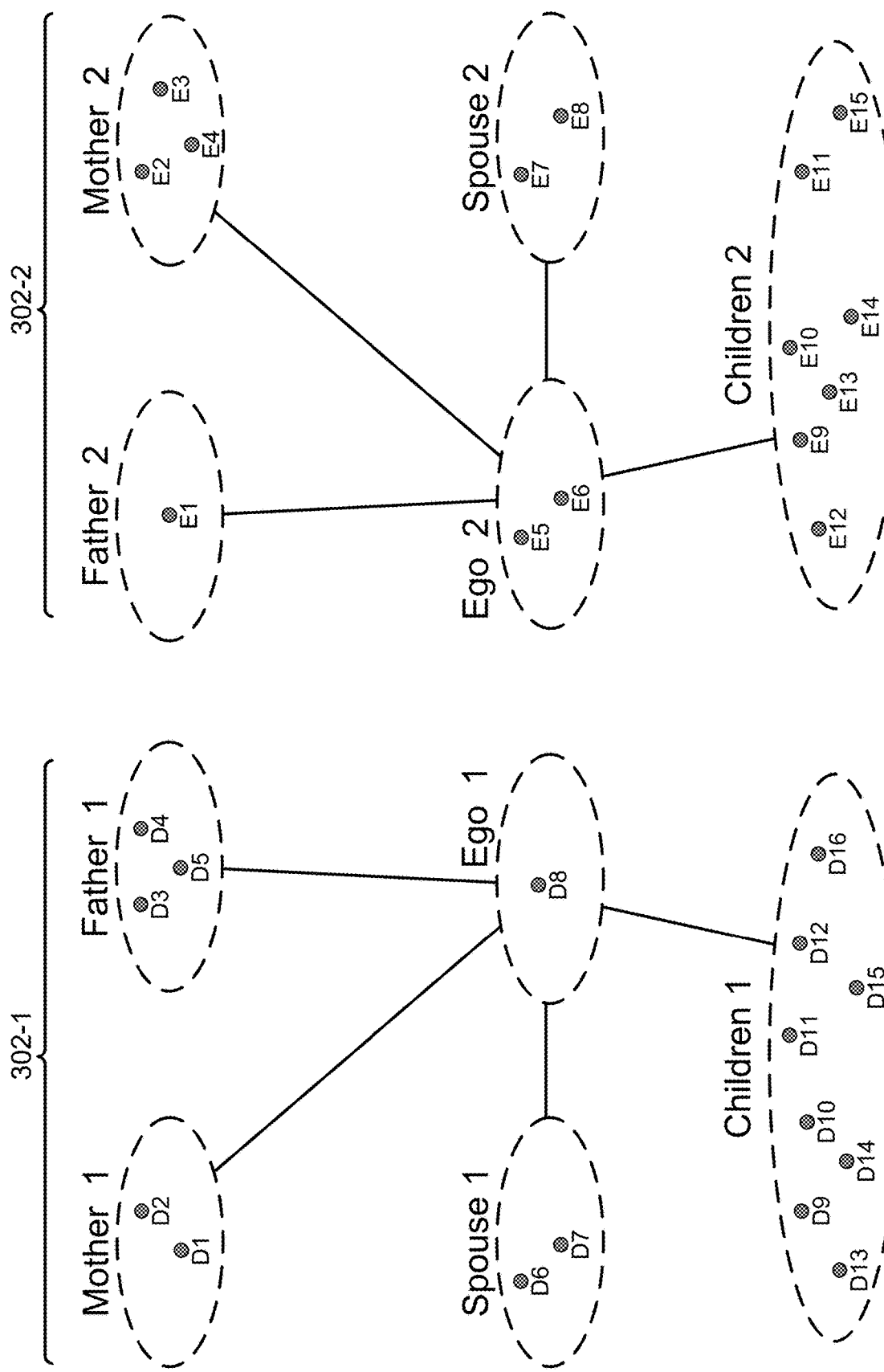
FIGS. 3A-3F illustrate various steps for determining whether two tree persons correspond to the same individual, according to an embodiment of the present disclosure.
Figure 3B:
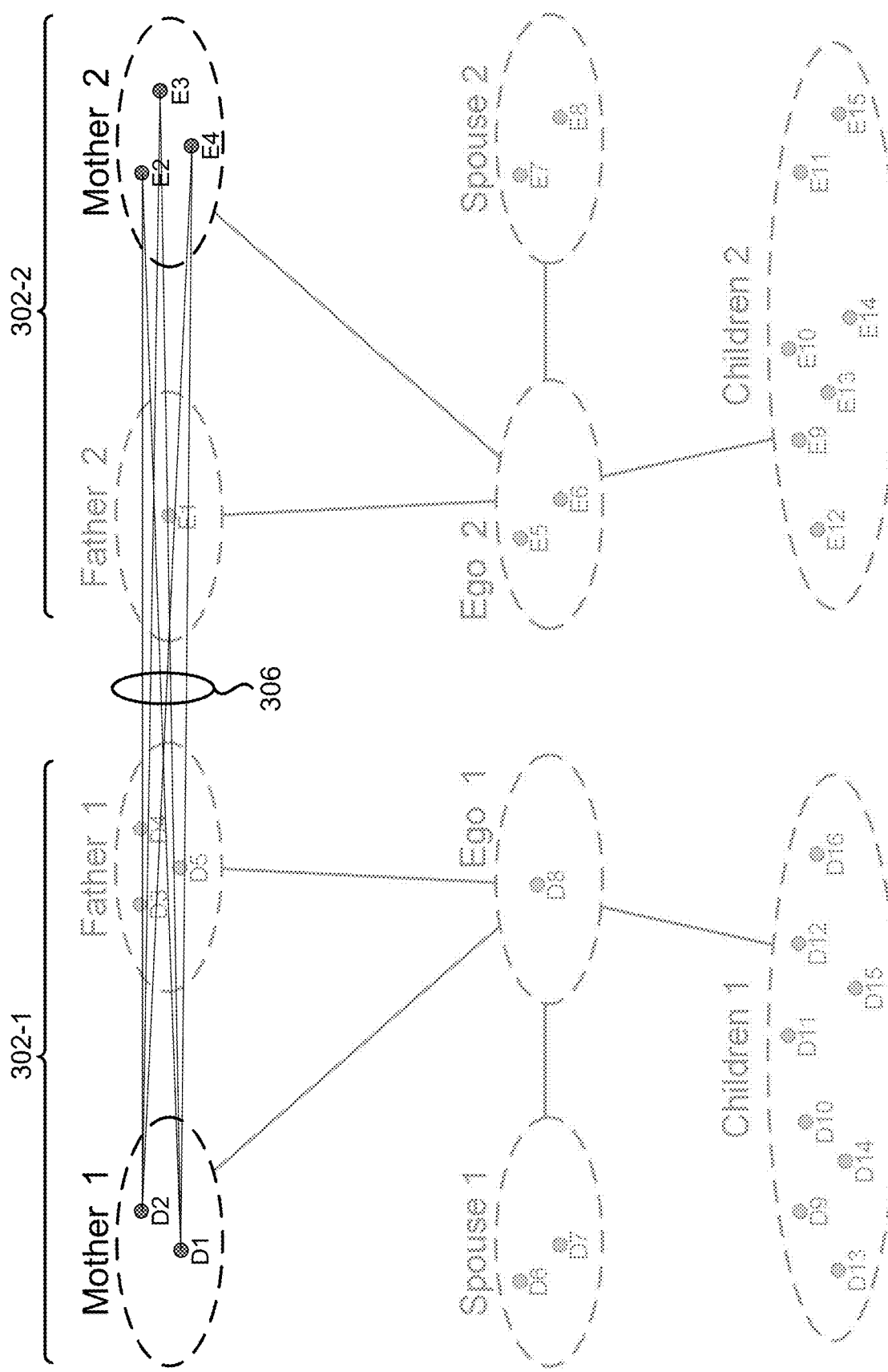
Figure 3C:
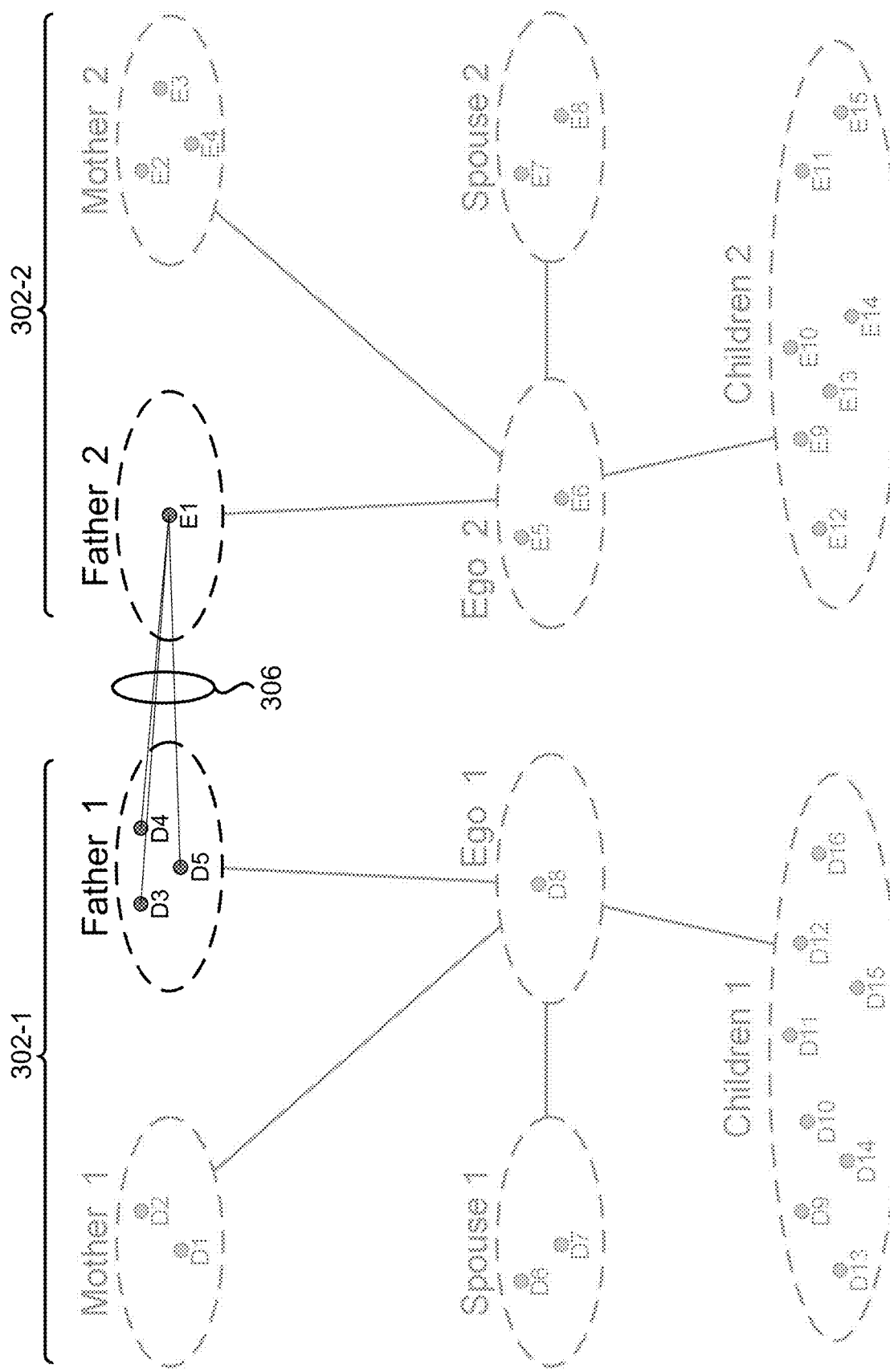

In reference to FIG. 3A, each familial category of familial categories 302 is considered to have two parts, e.g., Mother 1 and Mother 2 are collectively considered to be a single familial category, Father 1 and Father 2 are collectively considered to be a single familial category, Ego 1 and Ego 2 are collectively considered to be a single familial category, etc. Each familial category includes at least one tree person from each of the family trees of the tree persons being compared (tree person D8 and tree person E5). In some embodiments, familial categories 302 only include tree persons from the family trees of the tree persons being compared. In other embodiments, such as the example shown in FIG. 3A, additional tree persons that are from different family trees but belong to the same cluster as the tree person in the familial category may be included. For example, tree person D2 may share a cluster with tree person D1 (as indicated by cluster database 214) and may be included in the same familial category (Mother) as tree person D1. Also, each of tree persons D4 and D5 may share a cluster with tree person D3 (as indicated by cluster database 214) and may be included in the same familial category (Father) as tree person D3. Furthermore, each of tree persons D13-D16 may share a cluster with one of tree persons D9-D12 (as indicated by cluster database 214) and may be included in the same familial category (Children) as tree persons D9-D12.

After familial categories 302 have been identified, a first quantity of features may be extracted from each of the tree persons shown in FIG. 3A. Feature extraction may be performed by feature extractor 206, which may retrieve and/or receive the information from tree database 212. In some embodiments, the first quantity of features may be less than 5 features. For example, in some embodiments a first name, a last name, and a birth year may be extracted from each of the tree persons.

In reference to FIGS. 3B-3F, score generator 208 may generate similarity scores 306 between each possible pairing of tree persons in each familial category. For example, in reference to FIG. 3B, similarity scores are generated between the following pairings of tree persons in the Mother familial category: D1:E2, D1:E3, D1:E4, D2:E2, D2:E3, and D2:E4 (6 total). Next, the highest (i.e., maximum) similarity score is identified and the corresponding tree persons are identified as the representative pairing for the familial category. In the present example, the maximum similarity score corresponds to the pairing of tree persons D2 and E4. In reference to FIG. 3C, similarity scores are generated between the following pairings of tree persons in the Father familial category: D3:E1, D4:E1, and D5:E1 (3 total). Next, the highest (i.e., maximum) similarity score is identified and the corresponding tree persons are identified as the representative pairing for the familial category. In the present example, the maximum similarity score corresponds to the pairing of tree persons D3 and E1.

Figure 3D:
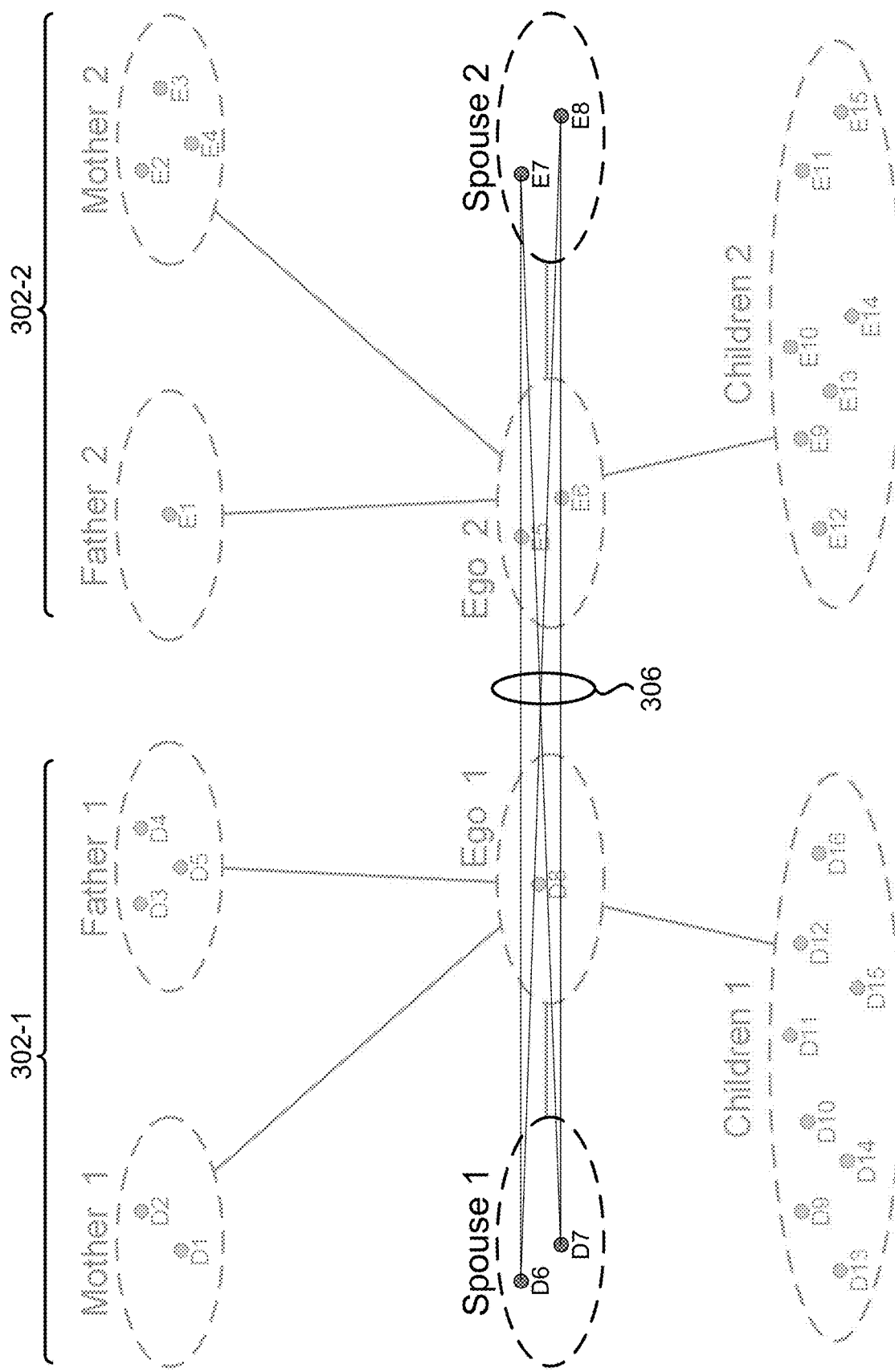
Figure 3E:
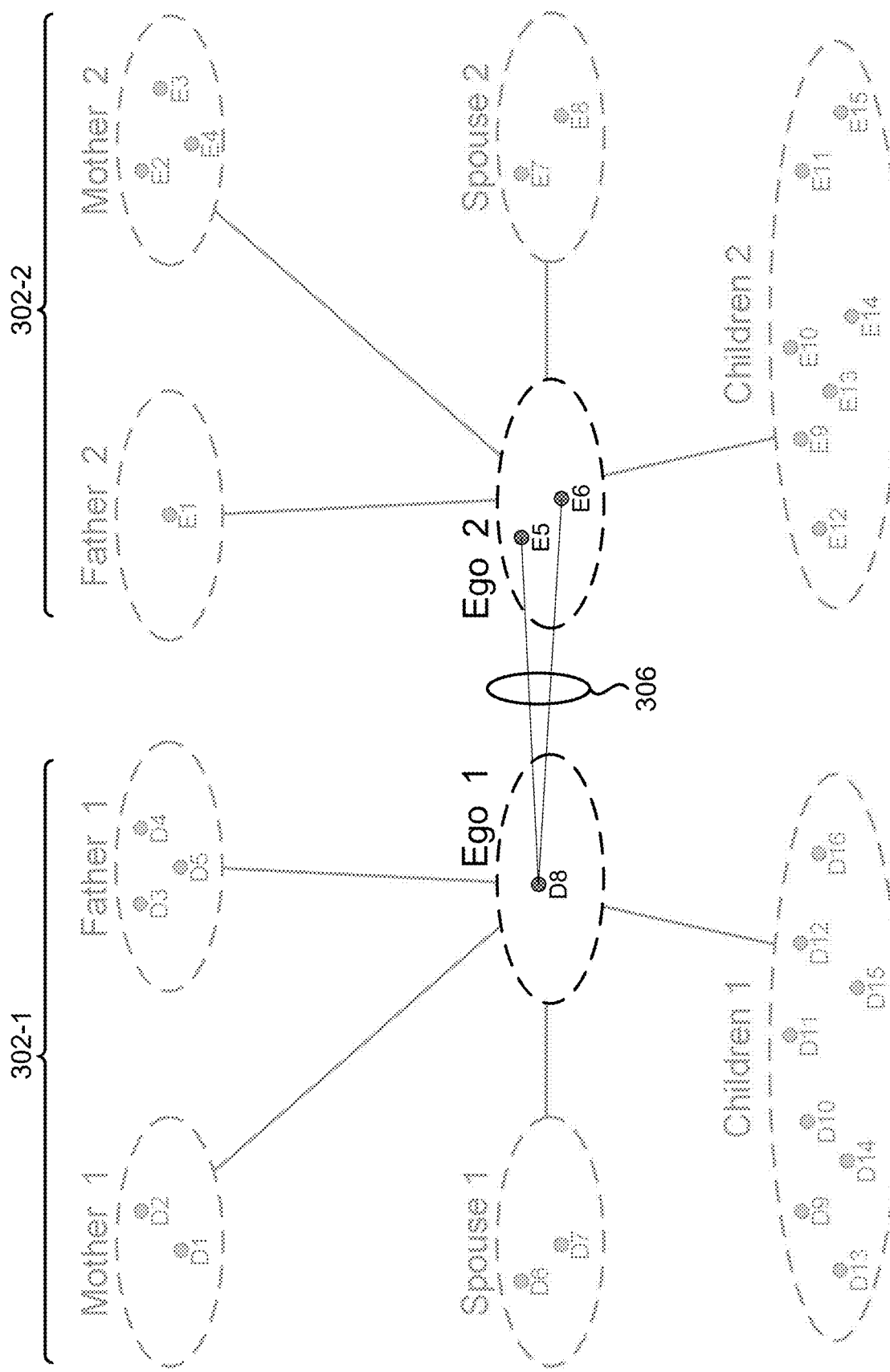
Figure 3F:
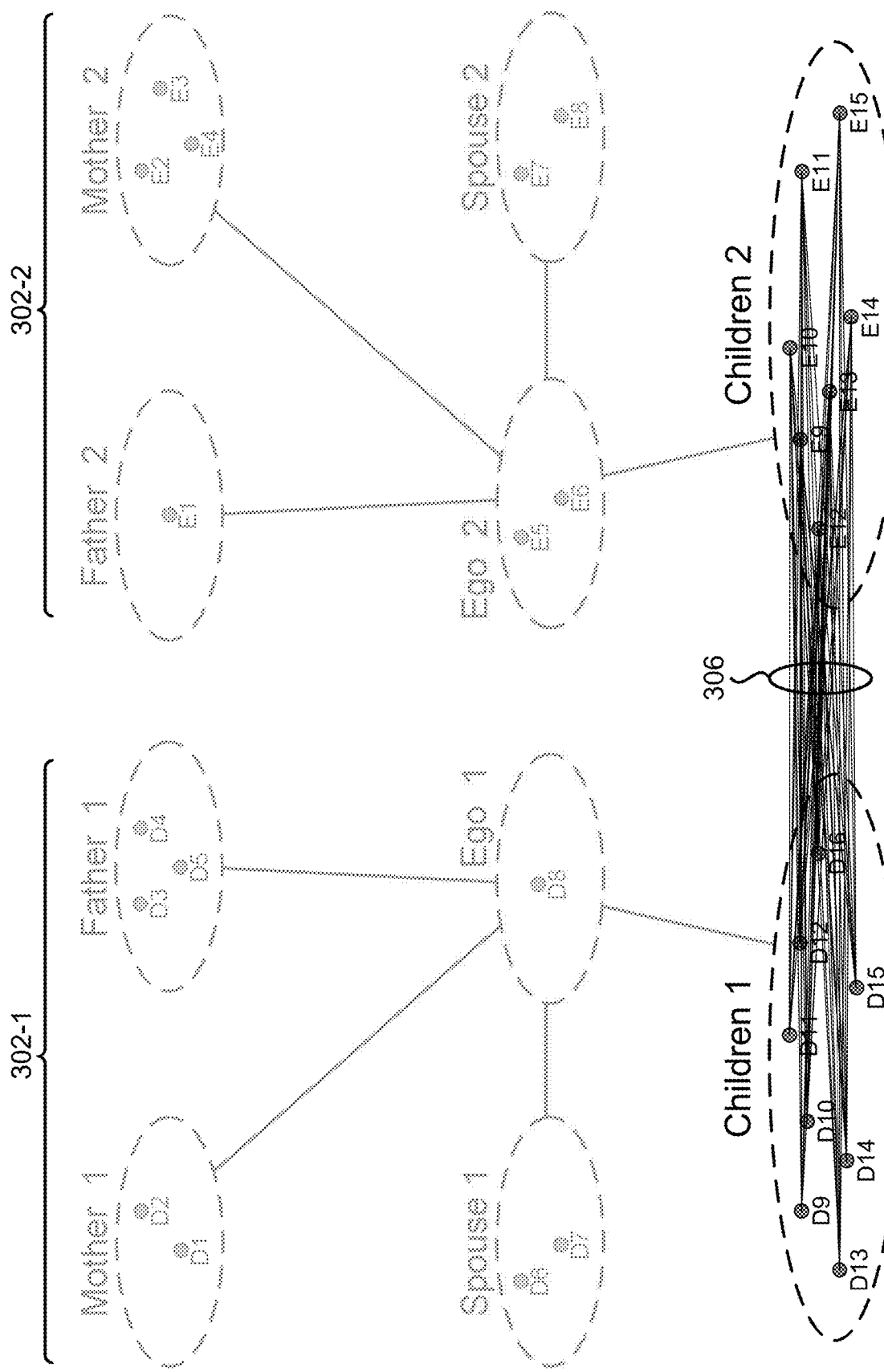

In reference to FIG. 3D, similarity scores are generated between the following pairings of tree persons in the Spouse familial category: D6:E7, D6:E8, D7:E7, and D7:E8 (4 total). In the present example, the maximum similarity score corresponds to the pairing of tree persons D6 and E7. In reference to FIG. 3E, similarity scores are generated between the following pairings of tree persons in the Ego familial category: D8:E5 and D8:E6 (2 total). In the present example, the maximum similarity score corresponds to the pairing of tree persons D8 and E6. In reference to FIG. 3F, similarity scores are generated between the following pairings of tree persons in the Children familial category: D9:E9, D9:E10, D9:E11, D9:E12, D9:E13, D9:E14, D9:E15, D10:E9, D10:E10, D10:E11, D10:E12, D10:E13, D10:E14, D10:E15, D11:E9, D11:E10, D11:E11, D11:E12, D11:E13, D11:E14, D11:E15, D12:E9, D12:E10, D12:E11, D12:E12, D12:E13, D12:E14, D12:E15, D13:E9, D13:E10, D13:E11, D13:E12, D13:E13, D13:E14, D13:E15, D14:E9, D14:E10, D14:E11, D14:E12, D14:E13, D14:E14, D14:E15, D15:E9, D15:E10, D15:E11, D15:E12, D15:E13, D15:E14, D15:E15, D16:E9, D16:E10, D16:E11, D16:E12, D16:E13, D16:E14, and D16:E15 (56 total). In some embodiments, the highest (i.e., maximum) three similarity scores are identified and the corresponding tree persons are identified as the representative pairings for the familial category. The highest three similarity scores may be the highest three similarity scores with unique tree persons. In the present example, the maximum similarity score corresponds to the following pairings of tree persons: D9:E14, D13:E10, and D15:E11.

Figure 4A:
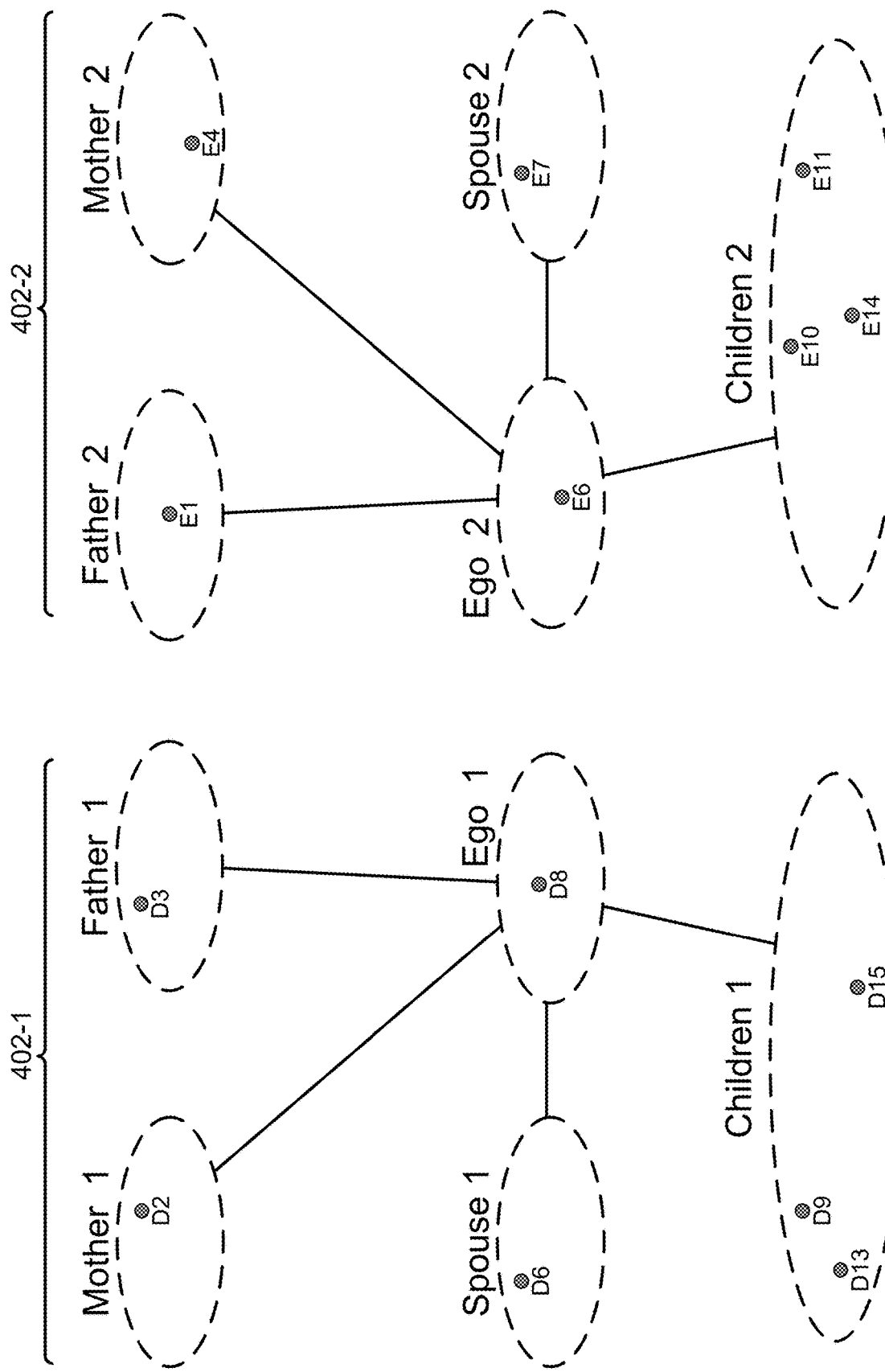
FIGS. 4A-4B illustrate various steps for determining whether two tree persons correspond to the same individual, according to an embodiment of the present disclosure.
Figure 4B:
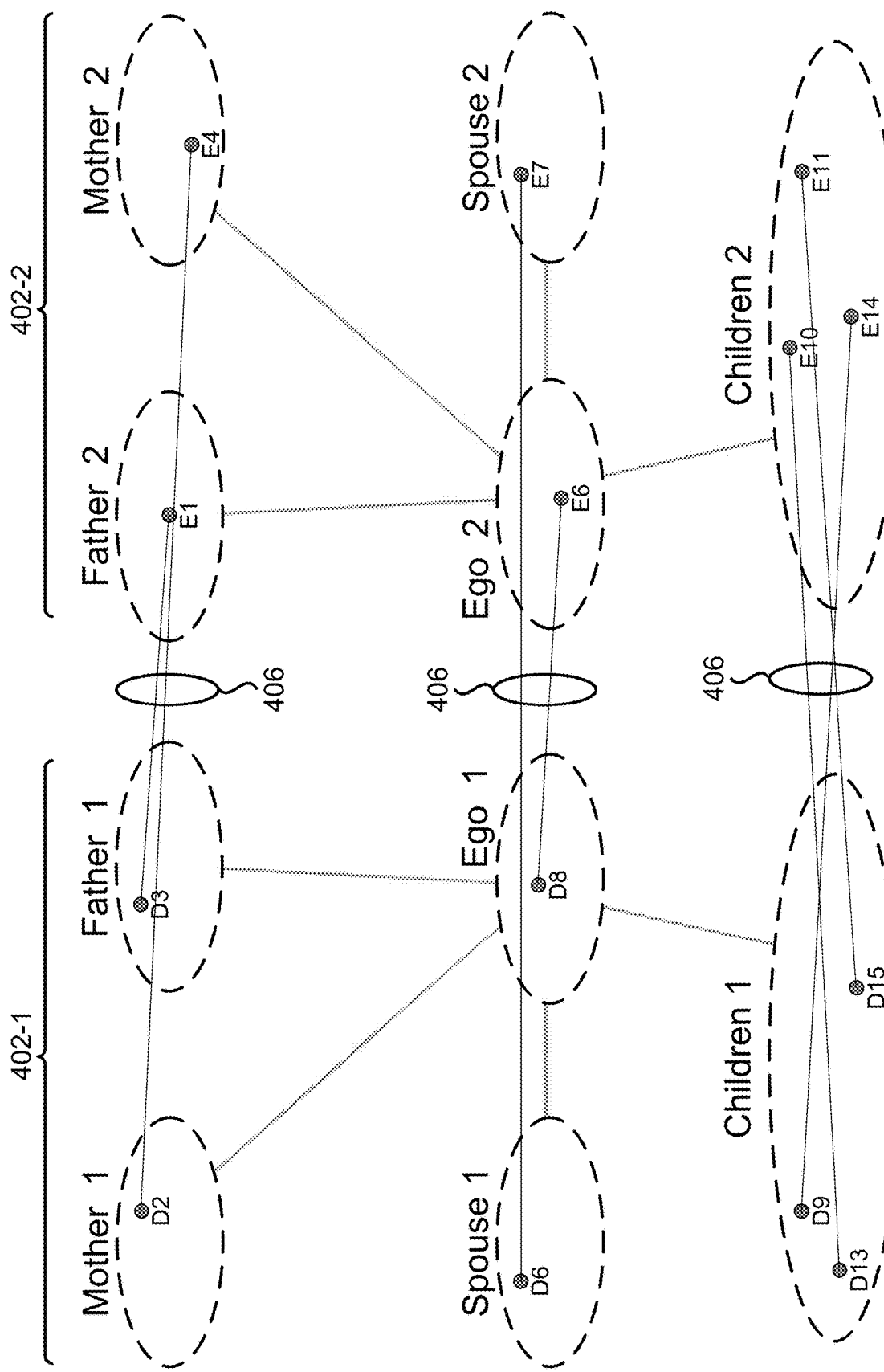

FIGS. 4A-4B illustrate various steps for determining whether two tree persons, tree person D8 and tree person E5, correspond to the same individual, according to an embodiment of the present disclosure. FIGS. 4A-4B continue with the example shown in FIGS. 3A-3F. After representative pairings are identified for each of familial categories 302, the tree persons within familial categories 302 that are not in a representative pairing are removed, resulting in familial categories 402. Next, a second quantity of features may be extracted from each of the tree persons shown in FIG. 4A. Feature extraction may be performed by feature extractor 206, which may retrieve and/or receive the information from tree database 212. In some embodiments, the second quantity of features may be greater than 50 features. For example, in some embodiments a first name, a last name, and a birth year may be extracted from each of the tree persons.

In reference to FIG. 4B, score generator 208 may generate similarity scores 406 between each representative pairing of tree persons in each familial category. In a first approach, a final similarity score between tree persons D8 and E5 is generated based on each of similarity scores 406 (e.g., an average or weighted average of similarity scores 406). In a second approach, a final similarity score between tree persons D8 and E5 is generated based on a collective calculation based on the second quantity of features for each of the tree persons in the representative pairings. After generating the final similarity score between tree persons D8 and E5, it is determined whether the first tree person and the second tree person correspond to the same individual based on the final similarity score.

Figure 5:
FIG. 5 illustrates a table showing various calculations for generating a score, according to an embodiment of the present disclosure.

FIG. 5 illustrates a table 500 showing an exemplary operation of feature extractor 206 and score generator 208, according to an embodiment of the present disclosure. For a tree person $TP_1$ corresponding to tree person 102a and a tree person $TP_2$ corresponding to tree person 102b, the feature extractor 206 may extract features f shown in the second and third columns of table 500 and send the features f to score generator 208. Score generator 208 may use the metrics specified in the fifth column of table 500 to calculate metric function s(f) shown in the fourth column. Score generator 208 may then generator a similarity score based on metric function Ali).

Figure 6:
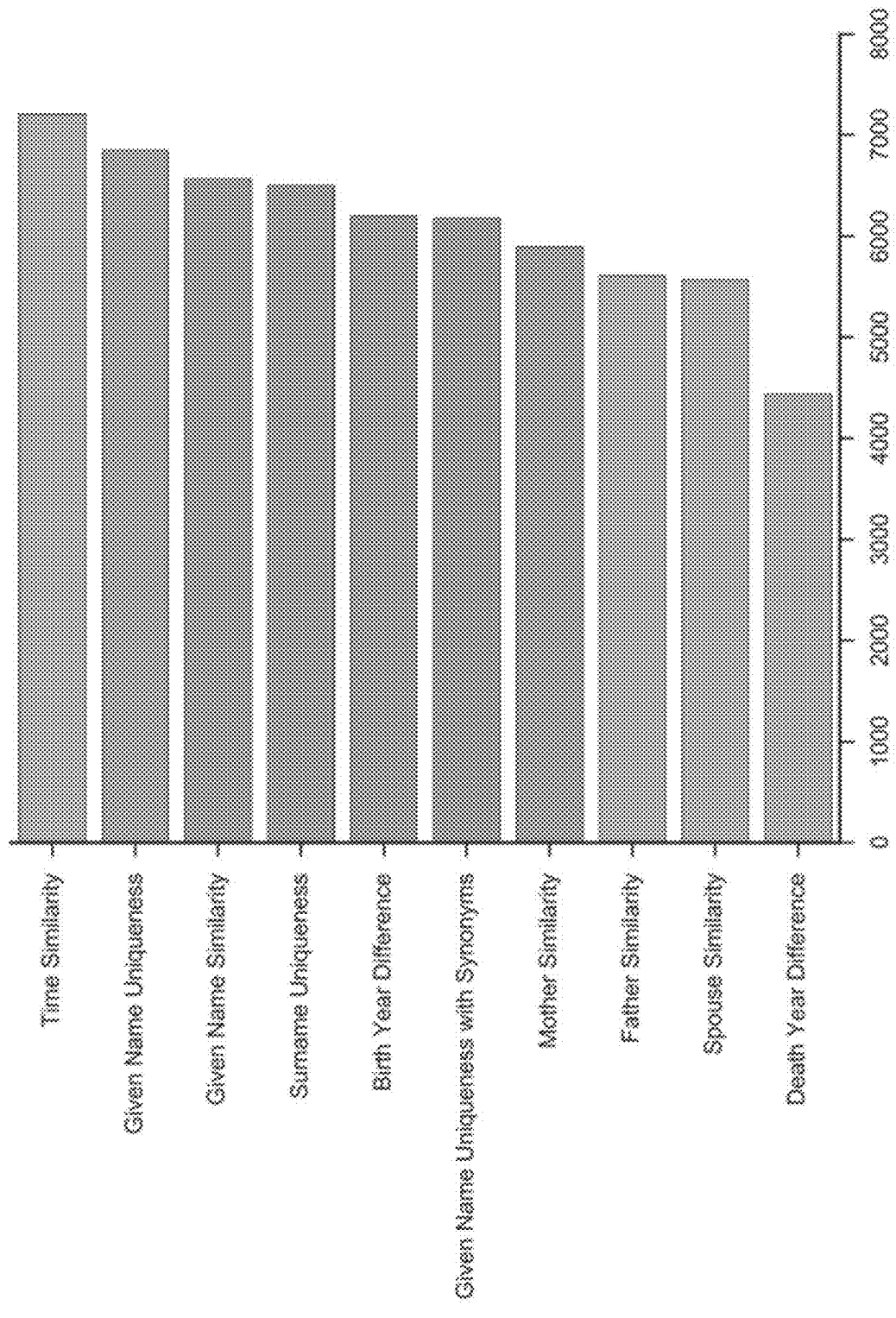
FIG. 6 illustrates a results diagram, according to an embodiment of the present disclosure.

FIG. 6 illustrates a results diagram 600 showing the relative importance of top features, according to an embodiment of the present disclosure. As shown in FIG. 6, names may be very important and powerful features. Also, similar family relations may be strong indicators of entity matching. Furthermore, birth features may be relevant even more so than death features. This is likely due to death information being more likely to be missing than birth information.

Figure 7:
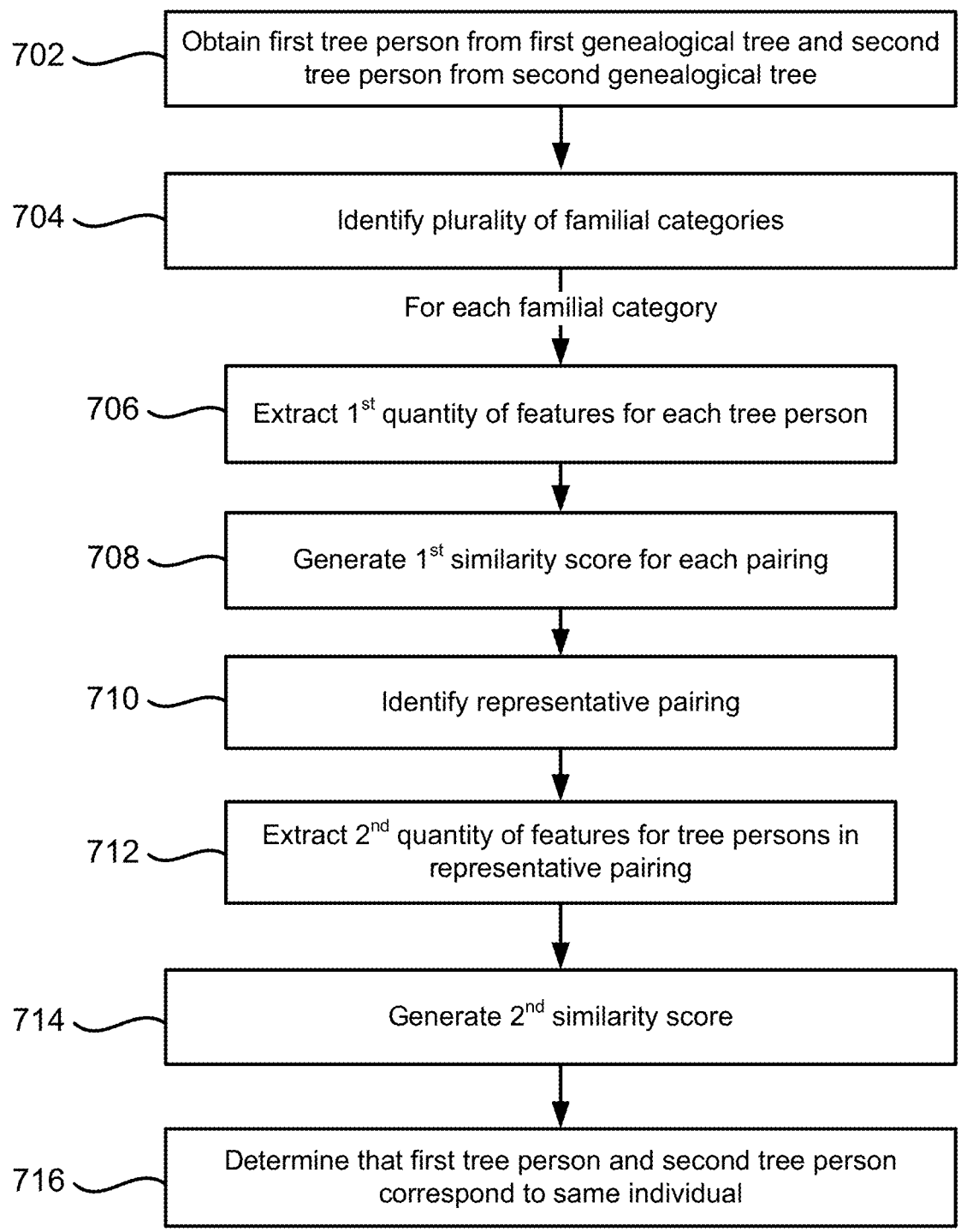
FIG. 7 illustrates a method for determining whether two tree persons correspond to the same individual, according to an embodiment of the present disclosure.

FIG. 7 illustrates a method 700 for determining whether two tree persons correspond to the same individual, according to an embodiment of the present disclosure. Performance of method 700 may include performing more or fewer operations than those shown in FIG. 7. For example, in some embodiments certain operations may be omitted. In some embodiments, the order of operations within method 700 may be different than that shown, and one or more operations may be performed simultaneously with other operations.

At block 702, a first tree person is obtained from a first genealogical tree and a second tree person is obtained from a second genealogical tree. In some embodiments, each of the first genealogical tree and the second genealogical tree include a plurality of interconnected tree persons corresponding to individuals that are related to each other. In one example, the first genealogical tree may include three tree persons: the first tree person, the father of the first tree person, and the mother of the first tree person. In another example, the first genealogical tree also includes five children of the first tree person and twenty grandchildren of the first tree person. In some instances, obtaining the first tree person and the second tree person may include receiving, retrieving, getting, acquiring, securing, selecting, and/or identifying the first tree person and the second tree person, respectively.

At block 704, a plurality of familial categories are identified. In some embodiments, each of the familial categories includes at least one tree person from each of the first genealogical tree and the second genealogical tree. In one example, five familial categories may be identified, each with a tree person from the first genealogical tree and a tree person from the second genealogical tree. Therefore, in some embodiments each familial category may include at least two tree persons (at least one from each genealogical tree). In some embodiments, the plurality of familial categories includes one or more of ego, mother, father, spouse, and child.

Blocks 706-712 may be performed for each familial category of the plurality of familial categories. In some embodiments, blocks 706-712 may be performed for multiple familial categories during a single iteration through blocks 706-712.

At block 706, a first quantity of features are extracted for each of the tree persons in the familial category. In some embodiments, the first quantity of features may include a first name, a last name, and a birth year.

At block 708, a first similarity score is generated for each possible pairing of tree persons from different genealogical trees based on the first quantity of features. In some embodiments, the total number of possible pairings is equal to the number of tree persons from the first genealogical tree multiplied by the number of tree persons from the second genealogical tree. In some embodiments, generating the first similarity score includes comparing each feature of the tree person from the first genealogical tree to the corresponding feature of the tree person from the second genealogical tree. The first similarity score may be an average, a sum, or some other calculation based on the comparisons.

At block 710, a representative pairing is identified based on a maximum first similarity score. In some embodiments, block 710 is preceded by an additional operation in which a maximum first similarity score is identified. The pairing of tree persons corresponding to the identified maximum first similarity score is labeled, designated, and/or assigned to be the representative pairing. In some embodiments, block 710 may include identifying more than one representative pairing (e.g., identifying two, three, or four representative pairings). For example, in some embodiments involving a children familial category, the three pairings of tree persons corresponding to the top three maximum first similarity scores are labeled, designated, and/or assigned to be the representative pairings.

At block 712, a second quantity of features are extracted for each of the tree persons in the representative pairing. In some embodiments, the second quantity of features includes one or more of a first name, a first name similarity, a first name uniqueness, a last name, a last name similarity, a last name uniqueness, a birth month, a birth day, a birth year, a death month, a death day, a death year, a marriage month, a marriage day, and a marriage year, a birth city, a birth county, a birth state, a birth country, a death city, a death county, a death state, a death country, a marriage city, a marriage county, a marriage state, a marriage country, a gender, a residence city, a residence county, a residence state, a residence country, a residence month, a residence day, a residence year. In some embodiments, the second quantity of features is more numerous than the first quantity of features.

At block 714, a second similarity score is generated based on the second quantity of features for each of the tree persons in the representative pairing for each of the familial categories. In some embodiments, generating the second similarity score includes comparing each feature of the tree person from the first genealogical tree to the corresponding feature of the tree person from the second genealogical tree for each representative pairing. The second similarity score may be an average, a sum, or some other calculation based on the comparisons.

At block 716, it is determined that the first tree person and the second tree person correspond to a same individual based on the second similarity score. The determination may include comparing the second similarity score to a predetermined threshold (e.g., 0.95).

Figure 8:
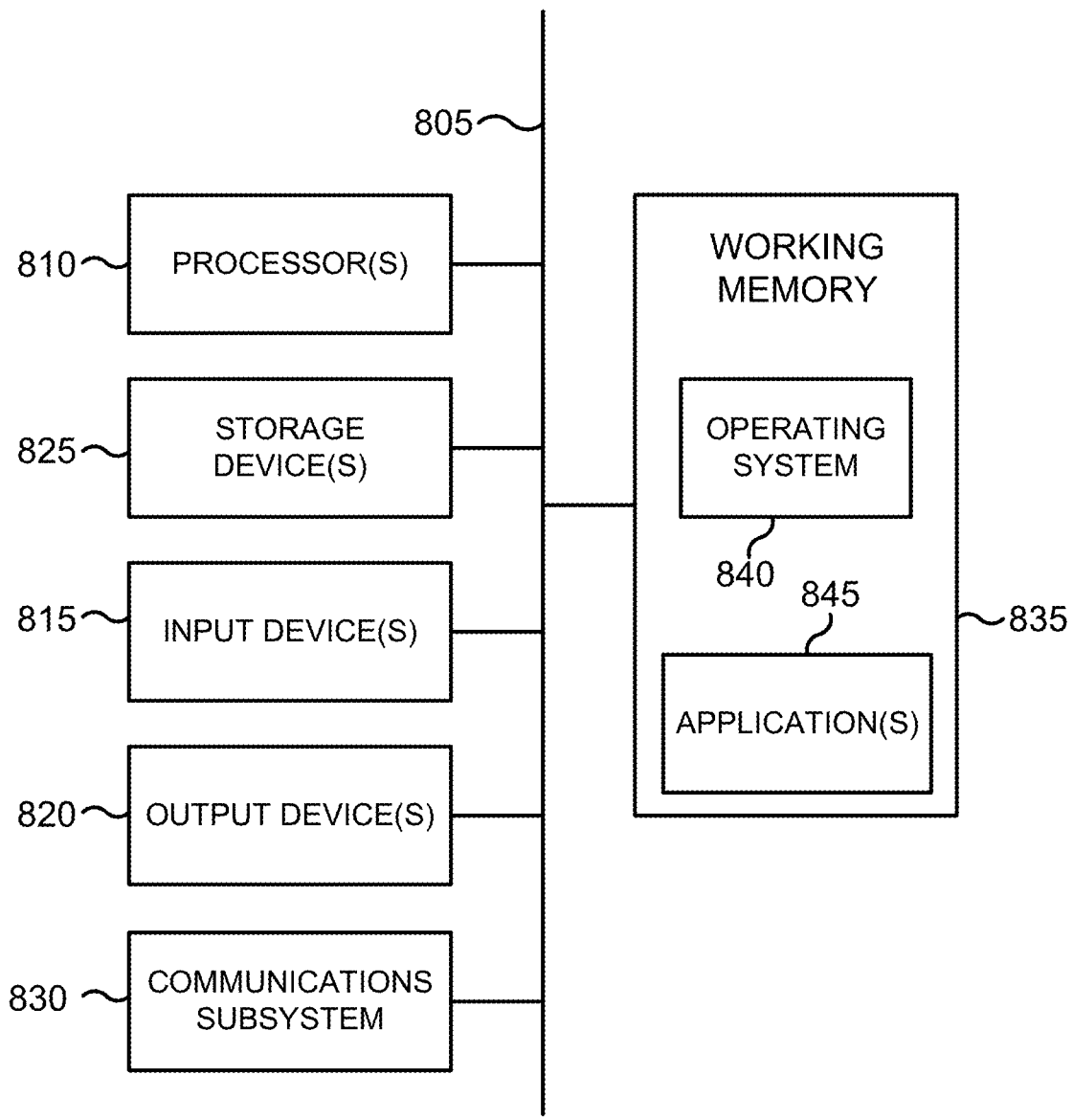
FIG. 8 illustrates a simplified computer system, according to an embodiment of the present disclosure.

FIG. 8 shows a simplified computer system 800, according to some embodiments of the present disclosure. A computer system 800 as illustrated in FIG. 8 may be incorporated into devices such as a portable electronic device, mobile phone, or other device as described herein. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include without limitation a mouse, a keyboard, a camera, and/or the like; and one or more output devices 820, which can include without limitation a display device, a printer, and/or the like.

The computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g. the first electronic device, may be incorporated into the computer system 800, e.g., an electronic device as an input device 815. In some embodiments, the computer system 800 will further comprise a working memory 835, which can include a RAM or ROM device, as described above.

The computer system 800 also can include software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform methods in accordance with various embodiments of the technology. According to a set of embodiments, some or all of the procedures of such methods are performed by the computer system 800 in response to processor 810 executing one or more sequences of one or more instructions, which might be incorporated into the operating system 840 and/or other code, such as an application program 845, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, wellknown circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A computer-implemented method for genealogical entity resolution comprising:
   at an online system comprising memory and one or more processors:
   obtaining, from a genealogical tree database, a first tree person from a first genealogical tree and a second tree person from a second genealogical tree, the first genealogical tree and the second genealogical tree each comprising a plurality of interconnected tree persons corresponding to individuals that are related to each other;
   identifying a familial category such that the familial category of the first genealogical tree comprises at least one tree person and the familial category of the second genealogical tree comprises a plurality of tree persons;
   extracting a first feature for the at least one tree person from the first genealogical tree and a corresponding first feature for each of the plurality of tree persons from the second genealogical tree;
   generating a plurality of similarity scores, each similarity score based on a similarity of the first feature for the at least one tree person from the first genealogical tree to the corresponding first feature for respective tree persons of the plurality of tree persons from the second genealogical tree; and
   identifying a representative pairing of tree persons within the familial category of the first and second genealogical trees, the representative pairing having a maximum similarity score of the plurality of similarity scores.

2. The method of claim 1, further comprising:
   extracting a second feature for each of the tree persons in the representative pairing;
   generating a second similarity score based on the second feature for each of the tree persons in the representative pairing for the familial category;
   determining that the first tree person and the second tree person correspond to a same individual based on the second similarity score; and
   modifying one or more node connections of a cluster database such that a first node of the cluster database which corresponds to the first tree person connects directly with a second node of the cluster database which corresponds to the second tree person.

3. The method of claim 1, further comprising:
   obtaining, from a cluster database, an additional tree person sharing a cluster with a tree person in the first genealogical tree or the second genealogical tree, wherein the cluster database comprises a plurality of nodes corresponding to tree persons and node connections therebetween and identifies groups of tree persons from different genealogical trees which correspond to a same individual; and
   causing the additional tree person to be included in the familial category.

4. The method of claim 1, wherein the familial category is ego.

5. The method of claim 1, wherein the familial category is one of spouse, children, father, and mother.

6. The method of claim 5, wherein the familial category is a children category, and three representative pairings of tree persons in the first and second genealogical trees are determined based on a highest three similarity scores of the plurality of similarity scores.

7. The method of claim 1, wherein the plurality of similarity scores is generated for each familial category of a plurality of familial categories including two or more of ego, spouse, father, mother, and children.

8. The method of claim 1, wherein each similarity score of the plurality of similarity scores is generated based on a weighted sum of a metric function being weighted by machine-learned feature weights.

9. A non-transitory computer readable storage media comprising instructions that, when executed by one or more processors, cause the one or more processors to perform operations for genealogical entity resolution comprising:
   obtaining, from a genealogical tree database, a first tree person from a first genealogical tree and a second tree person from a second genealogical tree, the first genealogical tree and the second genealogical tree each comprising a plurality of interconnected tree persons corresponding to individuals that are related to each other;
   identifying a familial category such that the familial category of the first genealogical tree comprises at least one tree person and the familial category of the second genealogical tree comprises a plurality of tree persons;

extracting a first feature for the at least one tree person from the first genealogical tree and a corresponding first feature for each of the plurality of tree persons from the second genealogical tree;

generating a plurality of similarity scores, each similarity score based on a similarity of the first feature for the at least one tree person from the first genealogical tree to the corresponding first feature for respective tree persons of the plurality of tree persons from the second genealogical tree; and identifying a representative pairing of tree persons within the familial category of the first and second genealogical trees, the representative pairing having a maximum similarity score of the plurality of similarity scores.

10. The non-transitory computer readable storage media of claim 9, further comprising:

extracting a second feature for each of the tree persons in the representative pairing;

generating a second similarity score based on the second feature for each of the tree persons in the representative pairing for the familial category;

determining that the first tree person and the second tree person correspond to a same individual based on the second similarity score; and modifying one or more node connections of a cluster database such that a first node of the cluster database which corresponds to the first tree person connects directly with a second node of the cluster database which corresponds to the second tree person.

11. The non-transitory computer readable storage media of claim 10, wherein the first feature comprises a first plurality of features and the second feature comprises a second plurality of features, the second plurality of features being greater than the first plurality of features.

12. The non-transitory computer readable storage media of claim 9, further comprising:

obtaining, from a cluster database, an additional tree person sharing a cluster with a tree person in the first genealogical tree or the second genealogical tree, wherein the cluster database comprises a plurality of nodes corresponding to tree persons and node connections therebetween and identifies groups of tree persons from different genealogical trees which correspond to a same individual; and causing the additional tree person to be included in the familial category.

13. The non-transitory computer readable storage media of claim 9, wherein the first similarity score is generated based on a weighted sum of a metric function being weighted by feature weights.

14. The non-transitory computer readable storage media of claim 13, wherein the metric function comprises a metric between 0 and 1 and determined using one of Jaro-Winkler distance or cosine similarity.

15. A genealogical entity-resolution system comprising:

one or more processors;

one or more computer readable storage media comprising instructions that, when executed by the one or more processors, cause the one or more processor to perform operations including:

obtaining, from a genealogical tree database, a first tree person from a first genealogical tree and a second tree person from a second genealogical tree, the first genealogical tree and the second genealogical tree each comprising a plurality of interconnected tree persons corresponding to individuals that are related to each other;

identifying a familial category such that the familial category of the first genealogical tree comprises at least one tree person and the familial category of the second genealogical tree comprises a plurality of tree persons;

extracting a first feature for the at least one tree person from the first genealogical tree and a corresponding first feature for each of the plurality of tree persons from the second genealogical tree;

generating a plurality of similarity scores, each similarity score based on a similarity of the first feature for the at least one tree person from the first genealogical tree to the corresponding first feature for respective tree persons of the plurality of tree persons from the second genealogical tree; and identifying a representative pairing of tree persons within the familial category of the first and second genealogical trees, the representative pairing having a maximum similarity score of the plurality of similarity scores.

16. The genealogical entity-resolution system of claim 15, further comprising:

extracting a second feature for each of the tree persons in the representative pairing;

generating a second similarity score based on the second feature for each of the tree persons in the representative pairing for the familial category;

determining that the first tree person and the second tree person correspond to a same individual based on the second similarity score; and modifying one or more node connections of a cluster database such that a first node of the cluster database which corresponds to the first tree person connects directly with a second node of the cluster database which corresponds to the second tree person.

17. The genealogical entity-resolution system of claim 16, wherein the second feature is a plurality of features greater than 50.

18. The genealogical entity-resolution system of claim 16, wherein determining that the first tree person and the second tree person correspond to a same individual comprises comparing the second similarity score to a predetermined threshold.

19. The genealogical entity-resolution system of claim 15, wherein the first similarity is score is generated based on a weighted sum of a metric function being weighted by machine-learning generated feature weights.

20. The genealogical entity-resolution system of claim 15, wherein the first feature comprises a first plurality of features and the second feature comprises a second plurality of features, the second plurality of features being greater than the first plurality of features.

* * * * *